United States Patent
Pignier et al.

(10) Patent No.: US 10,186,864 B2
(45) Date of Patent: Jan. 22, 2019

(54) METHOD OF CONTROLLING THE ELECTRICAL REGULATION OF AN ELECTRICAL INSTALLATION AS A FUNCTION OF CURTAILMENT SETTINGS

(71) Applicant: ELECTRICITE DE FRANCE, Paris (FR)

(72) Inventors: Daniel Pignier, Bourg la Reine (FR); David Menga, Verrieres le Buisson (FR); Enrique Alberto Kremers, Karlsruhe (DE)

(73) Assignee: ELECTRICITE DE FRANCE, Paris (FR)

( * ) Notice: Subject to any disclaimer, the term of this patent is extended or adjusted under 35 U.S.C. 154(b) by 185 days.

(21) Appl. No.: 14/916,264

(22) PCT Filed: Sep. 1, 2014

(86) PCT No.: PCT/FR2014/052155
§ 371 (c)(1),
(2) Date: Mar. 3, 2016

(87) PCT Pub. No.: WO2015/033047
PCT Pub. Date: Mar. 12, 2015

(65) Prior Publication Data
US 2016/0218508 A1    Jul. 28, 2016

(30) Foreign Application Priority Data
Sep. 3, 2013 (FR) .................................... 13 58436

(51) Int. Cl.
*G06F 19/00* (2018.01)
*H02J 3/14* (2006.01)
*G05B 15/02* (2006.01)

(52) U.S. Cl.
CPC ................ *H02J 3/14* (2013.01); *G05B 15/02* (2013.01); *H02J 2003/143* (2013.01);
(Continued)

(58) Field of Classification Search
CPC ...... G05B 15/02; H02J 2003/143; H02J 3/14; Y02B 70/3225; Y02B 70/3266; Y04S 20/222; Y04S 20/224; Y04S 20/242
See application file for complete search history.

(56) References Cited

U.S. PATENT DOCUMENTS

| 6,765,787 | B2 * | 7/2004 | Beasley, III | ............. | H02B 1/52 |
|           |      |        |              |               | 174/480 |
| 8,235,747 | B2 * | 8/2012 | Fish         | ........      | G01R 11/20 |
|           |      |        |              |               | 324/74 |

(Continued)

FOREIGN PATENT DOCUMENTS

| EP | 1 950 504 A2 | 7/2008 |
| EP | 2 270 948 A1 | 1/2011 |
| WO | 2012/168323 A1 | 12/2012 |

OTHER PUBLICATIONS

Anonymous, "Stabilite des reseaux electriques," Wikipedia, Jun. 2, 2011, retrieved from internet: https://web.archive.org/web/20110602195550/http://fr.wikipedia.org/wiki/Stabilit%C3%A9_des_r%C3%A9seaux_%C3%A9lectriques on May 6, 2014, with machine generated English language translation, 10 pages.

*Primary Examiner* — Kidest Bahta
(74) *Attorney, Agent, or Firm* — Drinker Biddle & Reath LLP

(57) ABSTRACT

A method of monitoring an electrical installation comprising electrical feeders for powering devices in a regulated manner. The method comprises the steps of: consultation of a history of curtailments carried out on the feeders; as a function of the history consulted, determination for each of the feeders of a level of participation in a general electrical (Continued)

regulation of the installation; association of a curtailment priority rank with each of the participation levels determined for each of the feeders; and following the reception of a setting for general electrical regulation of the installation, curtailment of the feeders in order of priority rank.

17 Claims, 6 Drawing Sheets

(52) U.S. Cl.
CPC ....... *Y02B 70/3225* (2013.01); *Y02B 70/3266* (2013.01); *Y04S 20/222* (2013.01); *Y04S 20/224* (2013.01); *Y04S 20/242* (2013.01)

(56) References Cited

U.S. PATENT DOCUMENTS

| | | | |
|---|---|---|---|
| 2004/0061380 A1* | 4/2004 | Hann | H02J 1/06 307/43 |
| 2004/0075343 A1* | 4/2004 | Wareham | H02J 3/14 307/39 |
| 2008/0179410 A1* | 7/2008 | Yoon | F24F 3/06 236/51 |
| 2009/0043519 A1* | 2/2009 | Bridges | G01D 4/004 702/62 |
| 2012/0215470 A1* | 8/2012 | Maguire | G01R 15/18 702/62 |

* cited by examiner

METHOD OF CONTROLLING THE ELECTRICAL REGULATION OF AN ELECTRICAL INSTALLATION AS A FUNCTION OF CURTAILMENT SETTINGS

CROSS-REFERENCE TO RELATED APPLICATIONS

This application is the U.S. national phase of the International Patent Application No. PCT/FR2014/052155 filed Sep. 1, 2014, which claims the benefit of French Application No. 13 58436 filed Sep. 3, 2013, the entire content of which is incorporated herein by reference.

BACKGROUND

The invention relates to the field of electrical installations, and particularly to a method for managing the electrical regulation within these installations as a function of curtailment settings.

Electric power providers seek to regulate and predict power consumption by electricity consumers, meaning their subscribers, because the current means of generating power have difficulty responding to large fluctuations in demands for energy.

In addition, the electric power produced by these means is usually much greater than the electric load actually consumed by subscribers, resulting in an overproduction phenomenon.

Electric power providers therefore wish to refine the monitoring of subscriber consumption in order to optimize electricity production to actual energy needs.

To this end, providers offer subscribers electrical installations (meter, panel, inverter, etc.) that can be equipped with management electronics. Such management electronics allow the measurement, processing, and/or communication of data relating to a subscriber's electricity consumption. These data are used, for example, to determine instantaneous consumption, consumption variations, and/or cycles of one or more subscribers, and thus to anticipate the electrical capacity necessary for the subscriber and/or a group of subscribers.

Furthermore, in order to regulate energy demand during peak consumption, providers are applying curtailment settings which aim to regulate consumption by one or more subscribers. It is thus possible for providers to reduce the effective electrical demand and keep it lower than the electric power produced by the production means. To do this, the management electronics for said installations receive the curtailment settings and control consumption of the installation accordingly. More particularly, the management electronics may decide to lower the consumption of the installation as a function of the curtailment settings received, particularly by reducing or even cutting the power temporarily to one or more devices connected to the installation.

However, with this type of electrical installation, it turns out that the management electronics may repeatedly curtail the same devices and/or the same subscribers. The participation of devices/subscribers in the electrical regulation is therefore unequal.

In addition, the devices may be electrically regulated by the management electronics when such regulation may not be suitable for:

proper operation of the device (for example cutting power to a refrigerator when a compression cycle has just started, or cutting power to a freezer too frequently, which can cause the food products stored in it to spoil), or maintaining the comfort of the subscriber (for example cutting power to heating devices of the subscriber when the ambient temperature in the subscriber's home is low).

Moreover, when the devices and/or subscribers are "curtailed" (electrically controlled by the management electronics as a function of the curtailment settings received), a spike consumption phenomenon generally occurs (also called a "rebound effect") when normal power is restored to the curtailed devices and/or subscribers all at the same time. This phenomenon is even more pronounced when a large number of devices and/or subscribers have been curtailed and are simultaneously restored to full power. Restoration of load for the curtailed devices/subscribers tends to create a new and abrupt collapse in the frequency. To compensate, new phases of curtailing installations/devices in the electrical grid may be required.

It is thus understood that there is a need for:
better control of the participation of devices/subscribers in the electrical regulation inherent to curtailment settings; and
reducing or avoiding the consumption peak that follows this regulation.

SUMMARY

The present invention improves the situation.

The invention provides a method and an electrical installation wherein, when a setting for general electrical regulation of the installation is received (in other words, a curtailment setting for the installation), the power usage of the installation is regulated while taking into account the participations accumulated during electrical regulations dictated by previously received settings.

To this end, a first aspect of the invention relates to a method for controlling an electrical installation comprising electrical feeders for supplying power to devices in a regulated manner.

In particular, the method comprises the steps of:
consulting a history of curtailments applied to the feeders;
determining for each of the feeders, on the basis of the history consulted, a level of participation in a general electrical regulation of the installation;
associating a curtailment priority rank with each of the levels of participation determined for each of the feeders; and
after receiving a setting for general electrical regulation of the installation, curtailing the feeders by order of their priority rank.

It is understood that:
"curtailment" means a temporary regulation of the electric power to one or more feeders such that the consumption of the installation is temporarily reduced; and
"setting for general electrical regulation of the installation" means a curtailment setting sent by an electric power provider or by an energy management means for the purposes of temporarily reducing consumption of the installation according to a dictated value.

In this method, it is understood that the determined level of participation allows establishing an order of priority for curtailing feeders. This prioritization allows scheduling curtailments within the installation. Such scheduling curtails the feeders in a non-random manner, to avoid curtailing the same feeders (and consequently the same devices and/or subscribers) over and over.

Feeder participation, established from the feeder curtailment histories, corresponds to a curtailment contribution (in other words the participations accumulated during electrical regulation of the installation) applied to comply with curtailment settings previously received by the installation. Curtailment priority ranks based on this participation directly contribute to the management of feeder regulation, in particular so as to converge towards equity in the curtailment contributions of the feeders.

The method thus improves the electrical regulation of the installation by offering, for example, the ability to give priority to curtailing feeders having little prior participation in the electrical regulation of the installation.

In one advantageous embodiment, the feeders are curtailed by order of their priority rank, at least until a general electrical regulation of the installation corresponding to the received setting has been reached.

Thus, the method gives priority to the feeders curtailed the least (lowest participation in contributing to the curtailment), and does so only until the reduction in consumption required by the received setting is reached. It is understood that the feeders having participated the most are less regularly curtailed, which tends to rebalance the participation of feeders with each new setting received.

In one advantageous embodiment, the method may further comprise a step of terminating the curtailment of curtailed feeders, with the termination of curtailment for each feeder being distributed over time for each feeder.

Distributing the load restoration to the feeders over time (in other words ending the regulation according to curtailment settings) allows a gradual readdition of the feeders, avoiding the sudden and simultaneous power draw that usually results in said rebound effect.

Advantageously, this distribution over time is based on the curtailment priority ranks associated with the levels of participation of the feeders.

In this manner, terminating the curtailment of feeders (in other words restoring normal power to curtailed feeders) is also done by order of curtailment priority rank. For example, the terminations can be organized by ascending order of priority. Thus, the feeders having priority when restoring power are those with the lowest priority ranks (in other words the feeders having participated the most in contributing to a curtailment). Terminations ordered by priority rank may be distributed over time for example with each after an interval $\Delta t$ of ten minutes.

In one possible embodiment, the distribution over time is random.

Curtailment of feeders is thus terminated on the basis of a rule of random selection. This embodiment may be advantageous when feeders have the same priority rank. To prevent feeders of the same priority from having normal power restored simultaneously (which could result in a new "rebound effect" at load restoration), the random selection allows randomly spreading over time the termination of curtailment of these feeders.

Advantageously, the method further comprises a step of collecting data from at least one current sensor associated with at least one of the feeders, this sensor measuring power consumption of the associated feeder. The level of participation of the associated feeder is also determined on the basis of the collected data.

In this embodiment, the level of participation obtained takes the consumption parameters into account, which allows optimizing the curtailment of feeders. Indeed, the level of participation of the feeder can then be determined in correlation with the measured consumption data, in particular so that the level of participation of the feeder also depends on:
  the available potential for curtailment (substantially corresponding to the surplus power supplied to the feeder relative to its actual measured consumption);
  the operating cycle of devices connected to the feeder;
  the energy efficiency required for the devices connected to the feeder to function properly;
  autonomous control of the feeder;
  the change in consumption behavior of the feeder (when the subscriber is on vacation for example);
  or other.

As an illustrative example, a heat pump and a refrigerator are connected to feeders of an installation. Assuming that they have a history of similar curtailments, if the heat pump is deactivated (placed in sleep mode by the subscriber), the current sensor detects a lower consumption than the usual consumption of the pump when in operation. It is no longer necessary to maintain power to the pump. To give priority to its curtailment, the feeder powering the heat pump can then be associated with a lower level of participation than the level of participation determined from the curtailment history. As for the refrigerator, it can keep the level of participation based on its history so that it does not have priority for curtailment.

Advantageously, the level of participation of at least one feeder is further determined according to the frequency of an electrical signal supplied by an electrical grid to which the installation is connected.

Thus, the level of participation of a feeder may be a function of the quality of the electrical signal (quality of its frequency) supplied to the installation by the grid upstream. Depending on the energy efficiency required by a feeder and by the devices connected to it, a level of participation is calculated while considering the determined quality of the signal, so as to give priority to curtailing feeders and devices for which the power conditions (signal frequency) are not optimal. It is understood that this embodiment is beneficial to the proper operation of devices connected to the installation.

Alternatively or additionally, the method comprises a step of collecting data from at least one home sensor measuring an environmental condition of the installation, the level of participation of the associated feeder being further determined on the basis of the collected data.

The determined level of participation thus takes into account the environmental conditions of the installation. Environmental conditions measured by the home sensor may be data concerning temperature, humidity, $CO_2$ levels in the air, brightness, motion, or other conditions. For example, when the dwelling reaches a low temperature, the participation of feeders of the installation supplying power to the heaters can be determined as being high so that the associated curtailment priority rank is preferentially low. In this case, when a curtailment setting is received, the heaters of the installation will not be curtailed first. The heaters will not be required to contribute as much to a forthcoming curtailment and can more quickly bring the room temperature to a temperature setting. This implementation is beneficial to subscriber comfort.

Here, it is understood that managing the participation of electrical feeders according to data collected via current sensors and home sensors reduces the negative impacts on subscriber comfort that are inherent to curtailments.

Additionally or alternatively, the installation comprises at least one heat exchanger among the devices, said exchanger communicating data on the temperature reached by the device. In this embodiment, the method advantageously determines the level of participation of the feeder powering the device, on the basis of the temperature data communicated by the heat exchanger.

The temperature data communicated by the heat exchanger allow determining a curtailment potential of this device and estimating the possibility of giving it curtailment priority. For example, the internal temperature of a water heater is measured and reported by a sensor located inside the device. When the measured temperature is high, the available reserve of water in the water heater and its thermal inertia no longer require prolonged heating. The water heater can thus be a candidate for power curtailment. Participation of the feeder to which the water heater is connected can then be determined as being low (typically lower than the level of participation determined from the curtailment history). This low level of participation can be associated with a high priority rank in order to give priority to curtailing the feeder of the water heater during future curtailments.

This advantageous embodiment is conducive to the proper operation of heat exchangers and to subscriber comfort.

The level of participation of the heat exchanger can be determined based on its internal temperature, its holding capacity, its heat capacity, or some other characteristic. The device may, for example, be a communicating freezer or refrigerator.

It is understood that the installation thus collects data allowing it to learn about:
consumption,
operating cycles,
environmental conditions of the installation,
changes in internal temperature (determination of the heat capacity of a device, in other words the internal thermal inertia of the device)
or other.

The level of participation of a feeder is therefore determined objectively on the basis of one of the above data items, or on a correlation of a plurality of the above data items. The order of priority is based on an objective level of participation of the device/subscribers, which allows determining a curtailment potential for the feeders as a function of the operating constraints of the device (consumption, operating cycles, environmental conditions, etc.).

The level of participation of a feeder can also be determined on the basis of a critical temperature the device is not to exceed, and also on the rate at which the temperature of this device changes over time (which in particular allows determining the thermal inertia of a heat exchanger to ensure that the electrical load required to run it is provided over time).

Thus, the order of priority established for feeder curtailment tends to balance out the participation of feeders of the installation in contributing to a curtailment, without significantly impacting user comfort or proper operation of the connected devices, unlike existing solutions.

A second aspect of the invention relates to an electrical installation comprising electrical feeders for supplying power to devices in a regulated manner. More particularly, this installation comprises at least:
a database adapted for storing a history of curtailments applied to the feeders;
a means for receiving a setting for general electrical regulation of the installation;
a data processing means adapted for:
determining for each of the feeders, on the basis of the history, a level of participation in a general electrical regulation of the installation;
associating a curtailment priority rank with each of the levels of participation determined for each of the feeders; and
curtailing the feeders by order of their priority rank.

Advantageously, at least one of the feeders comprises at least one current sensor adapted for measuring an outgoing current and a difference in potential.

According to an advantageous embodiment, the data processing means may further be configured to detect a frequency of an electrical signal supplied by an electrical grid to which said installation is connected.

Advantageously, the installation further comprises at least one home sensor measuring an environmental condition of the installation.

In an advantageous embodiment, at least one of the devices of the installation is a heat exchanger and comprises a means of communicating data concerning the temperature reached by the device.

The means of communicating data between the device and the feeder allows sending data from a temperature sensor placed for example in the device. The level of participation of the device can be determined based on its changes in temperature. For example, if a very low temperature must be maintained for a freezer, the level of participation of this device will be determined to be high so that it does not have curtailment priority when the next curtailment setting is received.

The current and/or home sensors (temperature, light, $CO_2$, etc.) and/or the temperature data communicated by the device, provide more or less long-term analyses (days/weeks/months) from which it is possible to determine more precisely the capacity for participation in curtailment of a feeder. This capacity may depend in particular on: the operating cycle, grid quality, a change in consumption, the internal temperature, the rate of change in stored heat, or the like.

In a first possible embodiment, the electrical feeder is an electrical socket. The devices can then be electrical devices plugged into the socket.

In a second possible embodiment, the electrical feeder is an electrical panel. The devices can then be electrical devices electrically connected to the panel, such as sockets and/or power strips, or household appliances.

In a third possible embodiment, the electrical feeder is an electrical hub. The devices can then be electric power distribution systems for subscriber dwellings, meters, and/or electrical panels electrically connected to the hub.

According to a third aspect, the invention further relates to a computer program intended to be stored in a memory of an electrical installation. This computer program is characterized in that it comprises instructions readable by a processor of the installation, the processor implementing the method of the invention when the instructions are executed by the processor.

BRIEF DESCRIPTION OF THE DRAWINGS

Other features and advantages of the invention will become apparent on examining the following detailed description and the accompanying figures in which.

For reasons of clarity, the dimensions of the elements represented in these figures are not necessarily in proportion to their actual dimensions. In the figures, identical references correspond to identical elements in the different embodiments described.

DETAILED DESCRIPTION

In the invention, an electrical installation is an infrastructure for supplying electricity, in a controlled manner, to devices which are electrically connected to the electrical feeders of the installation.

Figure 1:
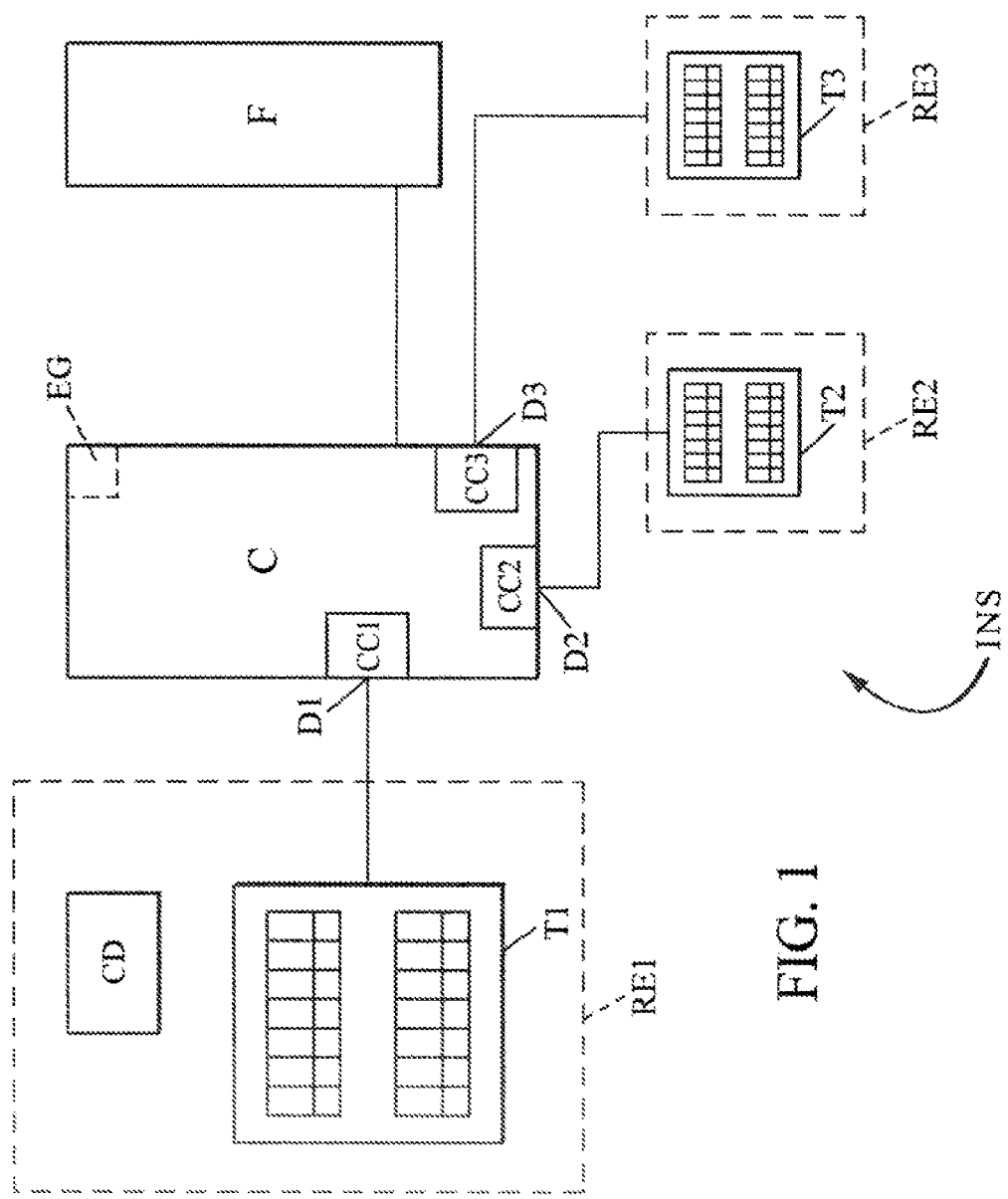
FIG. 1 illustrates a first exemplary embodiment of the electrical installation according to the invention.

A first exemplary embodiment of the electrical installation INS is illustrated in FIG. 1. The installation INS comprises a hub C which:

receives electrical power generated by production means of a provider F (a power station or a transformer for example); and supplies power from electrical feeders D1, D2, D3 to power distribution systems RE1, RE2, RE3.

The systems RE1, RE2, RE3 represent, for example, the electrical infrastructure of subscriber dwellings. Each distribution system may comprise at least one device connected to a feeder. The device in question may constitute a point of entry into the distribution systems RE1, RE2, RE3. Such a device may, for example, be an electricity meter (not shown in FIG. 1) or an electrical panel T1, T2, T3.

In order to regulate the power consumption of subscribers (particularly during periods of high consumption or of electricity production that is less than demand), the provider F can issue settings for general electrical regulation of the installation INS. Such settings may consist of ordering a temporary reduction of the total consumption of the installation INS to below a set threshold. To do this, regulation of the electrical power to the feeders D1, D2, D3 is used to limit consumption of devices in the distribution systems RE1, RE2, RE3 and thus to reduce the total consumption of the installation INS to below the set threshold. Each electrical regulation applied to each of the feeders is also called a "curtailment", and may consist of:

a temporary interruption of power at the feeder in order to stop power consumption of the connected device (for example in the case of a relay control), or a temporary change to the setting for the connected device (for example in the case of control by pilot wire).

To improve management of the curtailment of subscriber devices (for example panels T1, T2, T3), the installation INS may include management electronics EG installed in the hub C. The management electronics EG may comprise:

a database for storing a history of curtailments applied to the feeders;

a means for receiving settings for general electrical regulation of the installation INS;

a data processing means adapted for:

determining for each of the feeders, based on the history, a level of participation in a general electrical regulation of the installation;

assigning a curtailment priority rank to each of the levels of participation determined for each of the feeders; and curtailing the feeders by order of their priority rank.

The processing means of the installation INS calculates a curtailment priority and associates it with the feeders D1, D2, D3. When a setting for general electrical regulation of the installation INS is received, the feeders that have curtailment priority are those which for example have the lowest participation in the electrical regulation actions inherent to the previously received settings.

In addition, the electrical feeders D1, D2, D3 may comprise current sensors CC1, CC2, CC3 adapted for measuring an outgoing current and a difference in potential. Based on the data measured by the current sensors, the processing means can determine power consumption from the feeders. The database may be adapted to store the data measured by the sensors CC1, CC2, CC3.

The data processing means may also be adapted to measure the frequency of the electrical signal provided by an upstream electrical grid, for example between the installation INS and the production means of the provider F. The processing means can thus determine the quality of the electrical power supplied upstream by the provider F and determine the level of participation of the feeders accordingly.

In one possible embodiment, the installation may comprise at least one home sensor CD that collects data measuring an environmental condition of the installation. A home sensor CD may, for example, be installed in the dwelling of the subscriber and placed at his/her discretion. It may include sensors measuring humidity, smoke, air quality, brightness, motion, or some other condition. The data processing means of the installation INS may collect and store in the database the data measured by the home sensors CD. The level of participation of each of the feeders can thus be calculated as a function of environmental parameters of the feeders (room temperature, brightness, presence of the subscriber in the home, etc.). As an illustrative example, the home sensor CD is a presence sensor. When a subscriber presence has not been detected for several days, the data processing means can be configured to lower the level of participation of the heating system so that this system has curtailment priority during prolonged subscriber absences.

Figure 2:
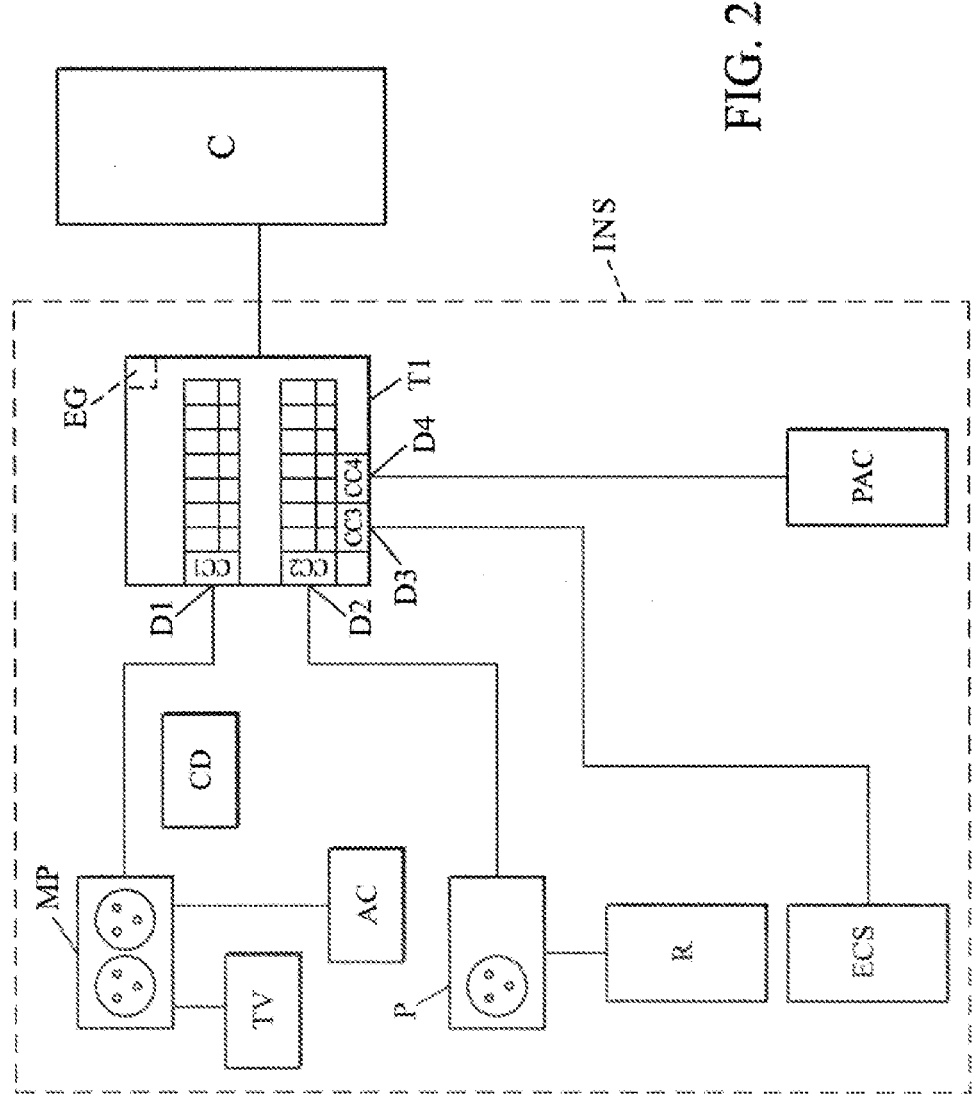
FIG. 2 illustrates a second exemplary embodiment of the electrical installation.

We now refer to FIG. 2, in which a second embodiment of the installation INS is illustrated. In this embodiment, the electrical installation INS is a power distribution system for a subscriber dwelling. It comprises an electrical panel T1 which is supplied power by the hub C. A meter (not shown in FIG. 2) may be arranged in between the panel T1 and the hub C.

The electrical panel T1 can supply power, through the electrical feeders D1, D2, D3, D4, to various devices such as:

a socket P;

a power strip of multiple sockets, MP;

a domestic hot water system ECS;

a heat pump PAC;

or some other device.

The socket P and the power strip MP allow supplying power to other devices such as a refrigerator R, a television TV, an air-conditioning system AC, or some other device.

The feeders D1, D2, D3, D4 may also comprise current sensors CC1, CC2, CC3, CC4 to measure power consumption at each feeder.

In this embodiment, the database, the receiving means, and the data processing means are arranged within a single management electronics module installed in the panel T1. However, other variants may be envisaged, in particular with these elements distributed within the installation.

By means of the current sensors CC1, CC2, CC3, CC4, the processing means of the installation INS can collect information on consumption cycles in the feeders of devices such as the refrigerator R, hot water heater ECS, and/or heat pump PAC. The processing means can then determine a level of participation as a function of the operating cycle of the device in question. As a purely illustrative example, the processing means can be configured so as to increase the level of participation of the refrigerator R when it has entered a compression cycle. Thus, the curtailment priority rank of the associated refrigerator can be low so that the compression cycle is not subject to cutoffs inherent to a setting (which could damage its motor).

The installation INS may also include at least one home sensor CD placed in the home of the subscriber, and which collects data measuring an environmental condition such as ambient temperature, brightness, presence of the subscriber in the home, or some other condition.

Figure 3:
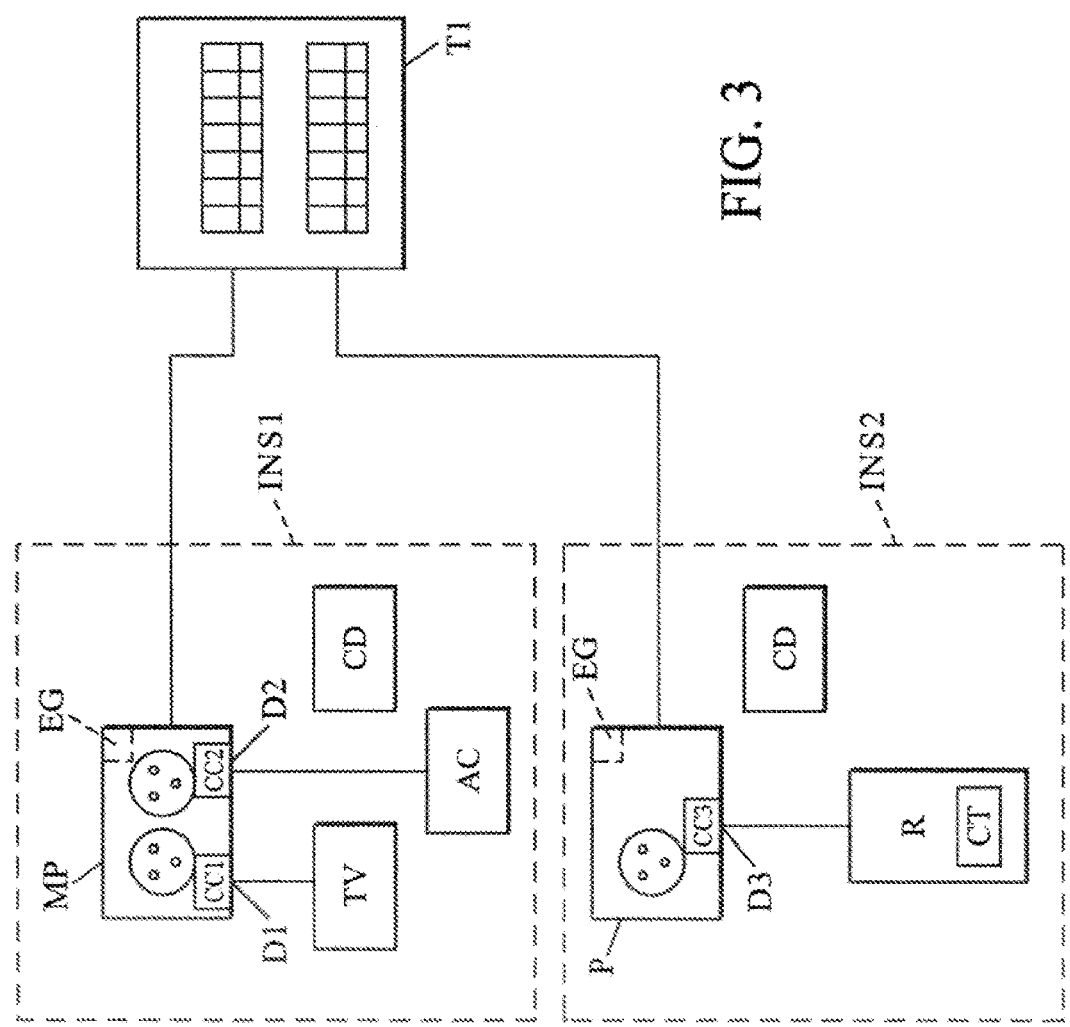
FIG. 3 illustrates a third exemplary embodiment of the electrical installation.

We now refer to FIG. 3 in which a third exemplary embodiment of the electrical installation is illustrated, in the form of a first installation INS1 and a second installation INS2 which are installed downstream of an electricity meter and/or an electrical panel T1.

The installations INS1 and INS2 comprise electrical feeders such as the socket P and power strip MP. These sockets are provided to supply power to the devices plugged into them, such as for example a television set TV, air conditioner AC, and refrigerator R.

To this end, the power strip of the first installation INS1 may comprise at least two electrical feeders D1, D2. The socket P of the second installation INS2 may comprise another electrical feeder D3.

These feeders of installations INS1 and INS2 may also comprise current sensors CC1, CC2, CC3 for measuring the power consumption at each feeder.

In this exemplary embodiment, the database, the receiving means, and the data processing means are arranged within a single management electronics module EG installed:
  in the strip MP of the first installation INS1, and
  in the socket P of the second installation INS2.

Due to the current sensors CC1, CC2, CC3, the processing means of the installations INS1 and INS2 are able to collect information on the consumption cycles of the devices plugged into the sockets or and/or power strips, and to determine from the collected data the level of participation of the devices.

Each of the installations INS1 and INS2 may also comprise at least one home sensor CD placed in the immediate vicinity of the installation (for example near the sockets and strips) in order to collect data measuring an environmental condition (room temperature, brightness, presence of the subscriber in the home, or other condition).

In addition, in the second installation INS2, the device connected to feeder D3 is a refrigerator R which comprises a means (not shown in the figures) for communicating data relating to the temperature reached by this device. In this case, the temperature data may be data from a temperature sensor installed inside the refrigerator R, this sensor being capable of detecting the internal temperature thereof.

The processing means of installation INS2 may also collect the communicated data. These data may be communicated via a radio link (for example WiFi, Bluetooth, or ZigBee) or a wired link (typically a PLC link via the electrical connection of the device to the feeder of the installation).

On the basis of the communicated data, the processing means can determine the level of participation and calculate the curtailment priority rank of the feeder of the refrigerator R based on its internal temperature. By way of illustration, this embodiment allows for example taking into account the current temperature inside the refrigerator in order to determine the possible duration of a curtailment applicable to this device while not allowing the internal temperature to exceed a threshold above which the foods stored therein can spoil.

In one possible embodiment of the electrical feeders D1, D2, D3, it may be arranged to provide two current sensors, one for measuring an outgoing current and one for a return current. The current sensors are then adapted to measure an outgoing current and a difference of potential at the socket. Any electrical fault occurring in the device plugged into the socket P or power strip MP can thus be detected by the current sensors, such as a short-circuit or overcurrent, or a current leakage fault in the device plugged into the socket, or a failure of the device to operate.

The three aforementioned embodiments are merely illustrative and are non-limiting. It is understood that the electrical installation may also concern other embodiments in which are found electrical feeders intended to supply power in a regulated manner to the devices connected directly or indirectly to these feeders.

Figure 4:
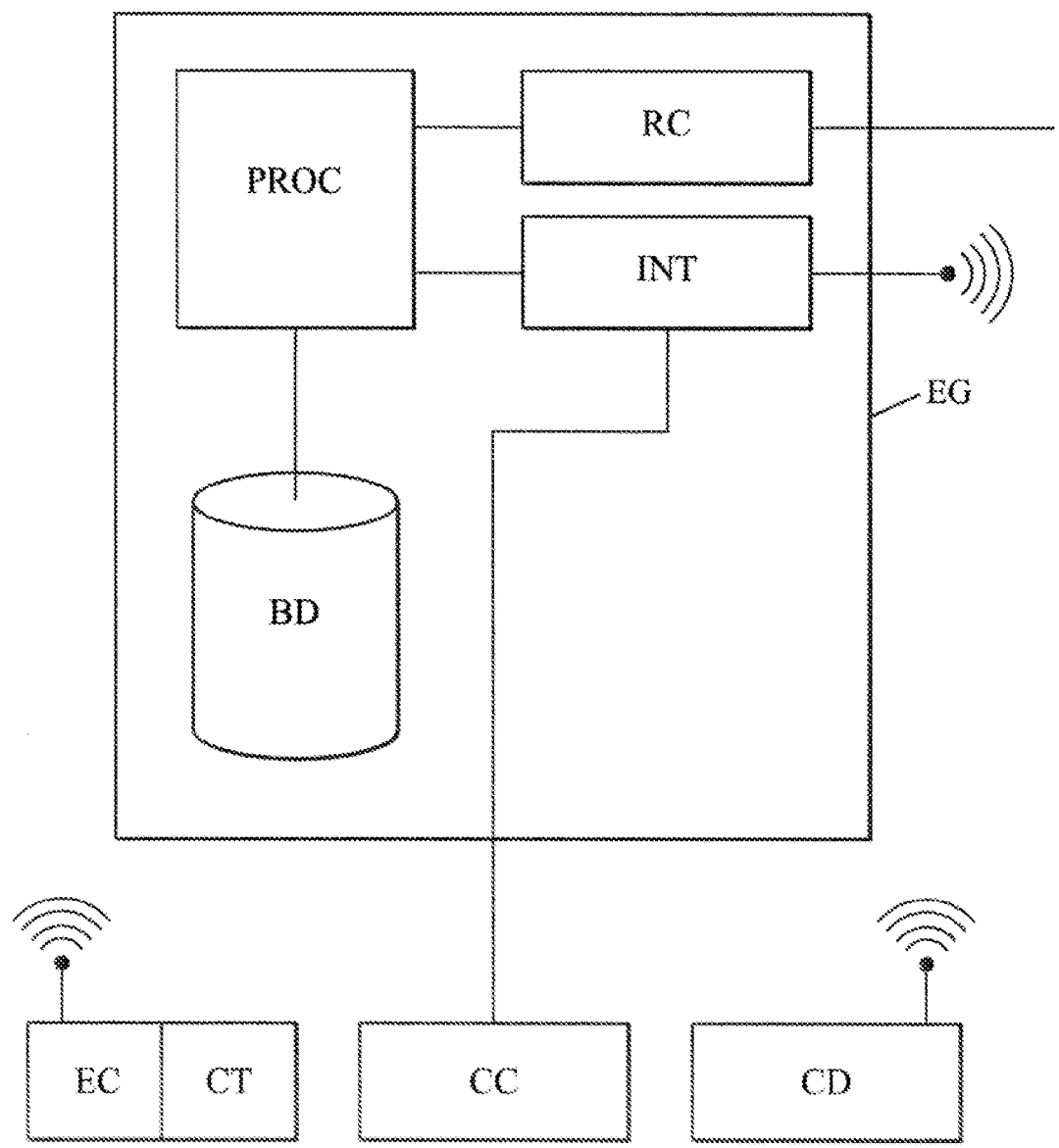
FIG. 4 shows an exemplary embodiment of the management electronics of the electrical installation.

In FIG. 4, an exemplary embodiment is represented in which means for implementing the control method according to the invention are assembled in a single management electronics module, comprising:
  a data processing means PROC (typically a processor);
  a communication interface INT;
  a receiver RC for receiving electrical regulation settings;
  a database BD.

The processing means PROC collects data from sensors such as:
  current sensors CC;
  temperature sensors CT; and
  home sensors CD.

These collected data are stored in the database BD of the installation. Such a database may be a "microSD" card (Secure Digital memory card) inserted into the module EG. The module EG thus constitutes a "black box" that tracks the electrical usage of devices connected to the feeders of the installation, storing in the database BD:
  a history of curtailments applied at the feeders of the installation;
  a history of the operation of devices connected to the feeders;
  a history of data collected from the sensors CC, CD, and CT.

The collected data are integrated into the history of electrical usage of the subscriber and can then be used as needed to determine a possible level of participation and to reconstruct events that have occurred in the home.

The current sensors CC collect information on consumption by the device or group of devices electrically connected to the feeders of the installation, and the data processing means PC collects and archives these data.

The temperature sensors CT collect information on the operating temperature of the device (internal temperature of a refrigerator or the heating temperature of a heater for example), in particular when the device is a heat exchanger EC. The exchanger EC communicates to the management electronics module EG the temperature data measured by the sensor CT in order to determine the level of participation of the feeder associated with the exchanger.

The home sensors CD collect data on environmental conditions of the installation, such as data on temperature, humidity, $CO_2$ levels in the air, brightness, subscriber presence, or other conditions.

To collect these data, the installation may for example use the communication interface INT. To this end, the interface INT may comprise at least:
a WiFi connection,
an infrared connection;
a Bluetooth connection;
a ZigBee connection;
a PLC (Power-Line Communication) connection.
Curtailment of feeders may be decided:
automatically by the processing means PROC as a function of the collected data and the curtailment history;
by the energy provider via a dedicated PLC command;
by the consumer who sends to the processing means PROC, via the communication interface INT, his/her agreement to or an order for a curtailment command.

For receiving the settings for general electrical regulation of the installation, the installation may use the settings receiver RC. This receiver RC is adapted to receive settings sent to the installation via the electrical grid of the energy provider, for example using the G3 Power-line communication protocol—GE-PLC.

In an exemplary embodiment, the management electronics receives:
consumption data relating to operating cycles of a freezer connected to a feeder of the installation;
the internal temperature data of the freezer.

Based on the data received, it is possible to determine for the freezer a level of participation in contributing to a curtailment, and to do so as a function of the heat capacity of the freezer. Indeed, the received data allow determining changes in the heat capacity (in particular according to changes in the temperature inside the freezer as a function of its operating cycles as read at the associated feeder) and to define the moments when curtailment of the freezer can be launched without a critical operating temperature of the device being exceeded (for example too high a temperature for storing frozen food). The level of participation can be determined based on a temperature threshold not to be exceeded or an internal temperature change rate not to be exceeded.

In addition, the level of participation can be determined based on data sent by the home sensor(s) CD. For example, the level of participation of the feeder associated with said freezer can be determined as a function of the temperature external to the device, in order to take into account the potential impact of high heat on the heat capacity and power consumption of the device.

According to one embodiment, the processing means PROC may further be configured to detect operating anomalies from the collected data, including:
a current leakage fault;
a short-circuit or overcurrent fault;
non-operation of the device connected to a feeder;
air quality, temperature, humidity, water leakage fault;
triggering of an intrusion alarm.

The processing means PROC can then issue a warning to the subscriber, via the communication interface INT for example.

The subscriber may also request, by means of a communicating device having appropriate software (smartphone, digital tablet, or computer for example), to view the data stored in the database BD. The communication interface INT allows reading the data collected in the database BD, processing these data, and formatting them to enable implementation of customized value-added services such as:
assisting the subscriber with consumption optimization; and/or
identifying failures in the event of an incident;
monitoring the electrical regulation performed within the installation in response to settings issued by the energy provider.

This information, accessible to the subscriber, further allows raising awareness of, managing, and optimizing energy consumption in the subscriber home and providing access to a detailed statement of electricity consumption of the installation and its devices.

In addition, the communication interface INT may allow the transfer of data stored in the database BD to an external system. For example, data collected and stored in the database BD can be automatically copied to an electrical panel of the home or to a secure digital strongbox, at a frequency determined by a parameter from the subscriber.

The interface INT also allows a consumer to configure the installation INS, for example by introducing an order of priority in favor of certain devices connected to feeders of the installation. The configuration of each feeder may include for example the following information:
the type of device connected (freezer, electric heating, air conditioning, TV, etc.);
type of control associated with it (ON/OFF, setpoint, etc.);
the upstream rating of a circuit breaker (10A, 16A, etc.) associated with it;
the type of electrical contract signed by the subscriber (base, off-peak/peak, etc.); and/or
the desired priority rank for the device (low, high, automatic).

The database BD is further adapted to store a computer program that includes instructions readable by the processing means PROC (typically a processor) in order to implement the method for controlling the electrical installation when the instructions are executed by the data processing means.

Curtailment of a feeder of the installation can be controlled by the processing means PROC via a consumption control regulation command to the feeder. This command can be of several types and may consist of:
a device operation command (command regulating the heating temperature of a heater, for example),
regulating the power at the feeder (limitation or interruption of the electrical power supplied to the feeder).

When the command is a device operation command, an appropriate communication interface (for example the interface INT) is provided for communicating the command to the device. This interface may include:
a pilot wire (in the case of heating, for example);
an infrared link (in the case of an air conditioner for example),
a relay control (in the case of a refrigerator, for example), or
a wireless connection (WiFi, Bluetooth);
or other.

An autonomous power source (not shown in the figures) may also be provided in the installation INS so that in the case of a general power outage:

the processing means PROC has sufficient autonomy to save the data in the database BD and to send an alert to the subscriber or to a third party via the interface INT; and anomaly detection is maintained.

For example, the installation may include a rechargeable battery ensuring degraded operation in the absence of external power.

According to one embodiment, the installation further comprises means for measuring the frequency of the electrical signal provided by the network. The processing means PROC can be configured to detect variations in the frequency of the electrical signal received, in particular by collecting data from the frequency measurement means. Typically, in France, electricity providers provide a 220V AC electrical signal at 50 Hz. However, such a situation may vary, particularly in small power grids that are not interconnected, such as in the overseas territories, for example, where demand fluctuations can impact the frequency of the electrical signal. In particular, the processing means PROC can be configured to detect a decrease in the frequency of the electrical signal and then order a curtailment of the current supplied to the feeders of the installation. In this manner, the devices connected to the feeders are protected from electrical signals of poor quality (and therefore from malfunctions inherent in such an underfrequency).

Data concerning the frequency measurement of the electrical signal supplied by the electrical grid may also be stored in the database BD of the installation along with the data collected by the current sensors CC. The consumer then knows when and for how long the device has been curtailed, and knows how his/her consumption and the grid quality have evolved over time.

The processing means PROC may also determine the level of participation of feeders on the basis of consumption data measured by the current sensors CC and of the consumption history stored in the database BD. The determined participation may be a function of the operating cycles of the devices of the installation, and thus a feeder can be curtailed without adversely affecting the operation of the device connected to it.

Figure 5:
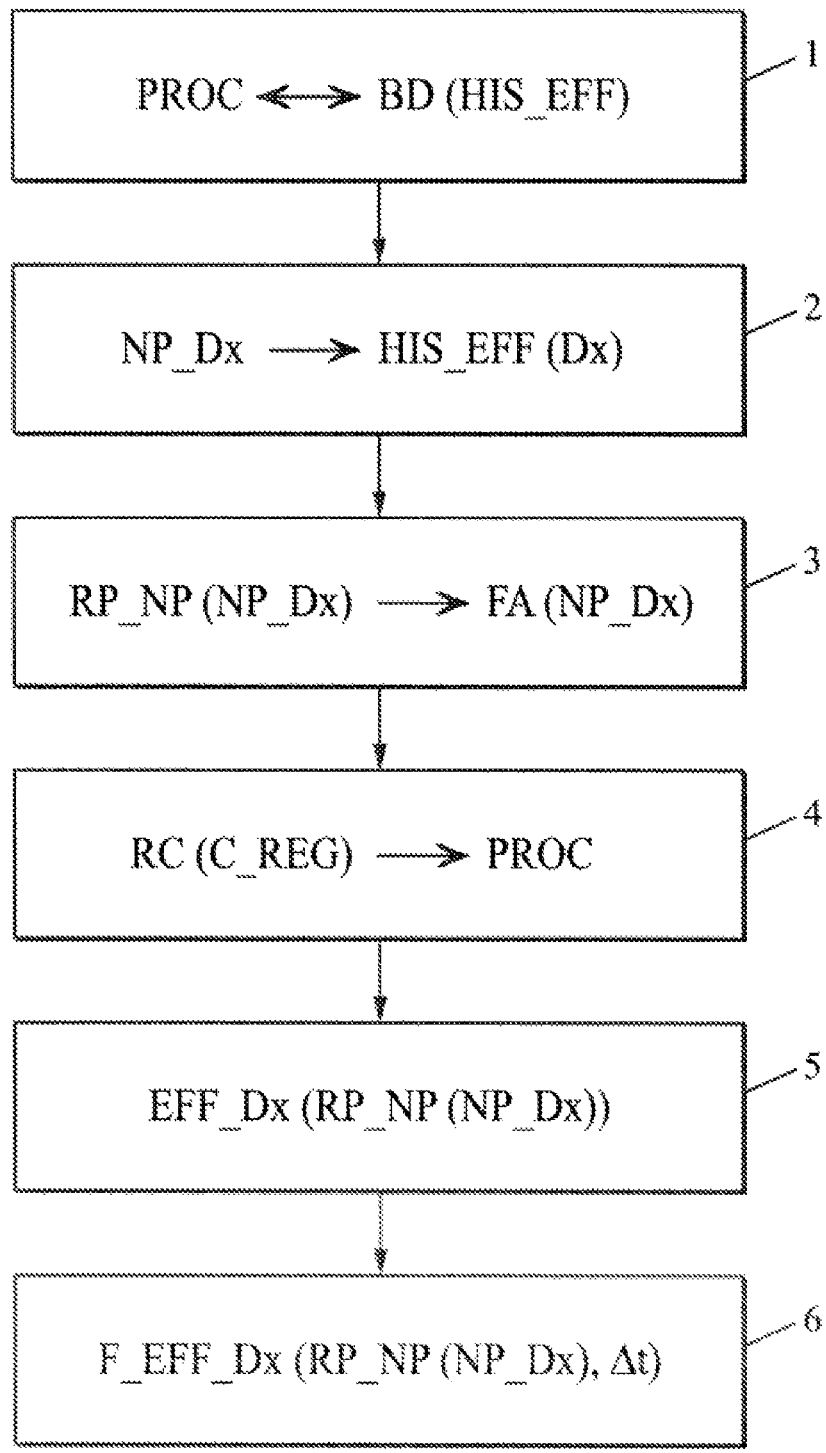
FIG. 5 is a flowchart which illustrates an example representation of the different steps of the method for controlling the electrical installation.

We now refer to FIG. 5, which shows an exemplary representation of the steps of the electrical regulation control method.

In step 1, the processing means PROC consults, in the database BD of the installation, the history of curtailments HIS_EFF applied to an integer number x of electrical feeders Dx of the installation.

In step 2, the processing means PROC determines for each x of the feeders Dx, based on the history HIS_EFF accessed in the database BD, a level of participation NP_Dx in a general electrical regulation of the INS installation. The level of participation NP_Dx of a feeder relates in particular to the electrical regulations implemented at the feeder in response to regulation settings previously received by the installation.

In step 2, additional steps may be provided whereby the processing means PROC may also correlate the data collected and/or stored in the database BD, originating from the current sensors CC (consumption data), home sensors CD (ambient temperature, brightness, motion, or other), and temperature sensors CT (of a communicating heat exchanger), with the means for measuring the frequency of an electrical signal, to determine the level of participation NP_Dx of the feeders Dx.

The level of participation NP_Dx determined for a feeder Dx according to the above correlation, establishes an order of priority that is dependent on an objective level of participation of the feeders, especially as a function of their operating and environmental constraints.

In a step 3, the processing means PROC associates a curtailment priority rank RP_NP with each of the levels of participation NP_Dx determined for each of the feeders Dx. This association may come from an association function AF that assigns a priority rank RP_NP to the participation levels NP_Dx according to defined selection criteria. These selection criteria define a priority rank RP_NP according to the value of the level NP_Dx. For example, a priority rank RP_NP of high value is assigned to low NP_Dx levels, and a priority rank RP_NP of low value is assigned to high NP_Dx levels. Thus, feeders Dx having contributed little to curtailments of the installation will be given priority in contributions to upcoming feeder curtailments.

In step 4, the installation receives a setting for general electrical regulation C_REG of the electrical installation, for example via the setting receiver RC of the installation INS. This setting C_REG may be sent by the energy provider in order to temporarily limit the overall power consumption of the installation. This setting C_REG, once received by the receiver RC, is sent to the processing means PROC of the installation INS.

In step 5, the processing means PROC curtails the feeders upon receipt of the setting (step 4), and does so according to a curtailment function EFF_Dx which curtails feeders Dx by order of their priority ranks RP_NP associated with the levels of participation NP_Dx of the feeders Dx (step 3). The curtailment function EFF_Dx may in particular be defined to curtail feeders in ascending or descending order of priority rank RP_NP.

This order of priority in curtailing the feeders Dx allows scheduling the curtailments within the installation. Feeders are curtailed in an ordered manner, not randomly as in existing solutions. The curtailment priority ranks based on this participation directly contribute to the management of feeder regulation, in particular so as to converge towards equity in the curtailment contributions of the feeders.

Existing solutions, limited to usage consumption measurement points, do not allow considering the comfort of occupants of a residence while still equalizing the participation of devices of an installation in contributing to a curtailment.

Feeders may advantageously be curtailed by order of priority rank in step 4, until a general electrical regulation of the installation has been achieved that corresponds to the received setting. Typically, if the setting received in step 4 orders reducing the overall consumption of the installation to 80% of the maximum load subscribed to in the energy contract of the subscriber, the processing means PROC can curtail the feeders Dx by ascending order of priority until the installation consumption is less than 80%.

Thus, the feeders having higher priority curtailment can be those which have for example been the least curtailed (the lowest participations in a curtailment), and this remains true only until the requested consumption limitation is achieved. It is understood that the feeders having participated the most part are less regularly curtailed, which tends to balance out the participation of feeders with each new setting received.

In step 6, the processing means PROC terminates curtailment of the curtailed feeders at times that are spread out over time, for example via a termination function F_EFF_Dx. In this step 6, the distribution over time may be based on priority ranks RP_NP associated with levels of participation NP_Dx determined for the feeders Dx. Termination of the curtailment of feeders may be ordered in ascending or descending order by their curtailment priority ranks, by the function F_EFF_Dx. In addition, terminations by priority rank may be distributed over time with each occurring after an interval Δt. This interval Δt defines the interval between moments when termination of the curtailment of the feeders is triggered.

Figure 6:
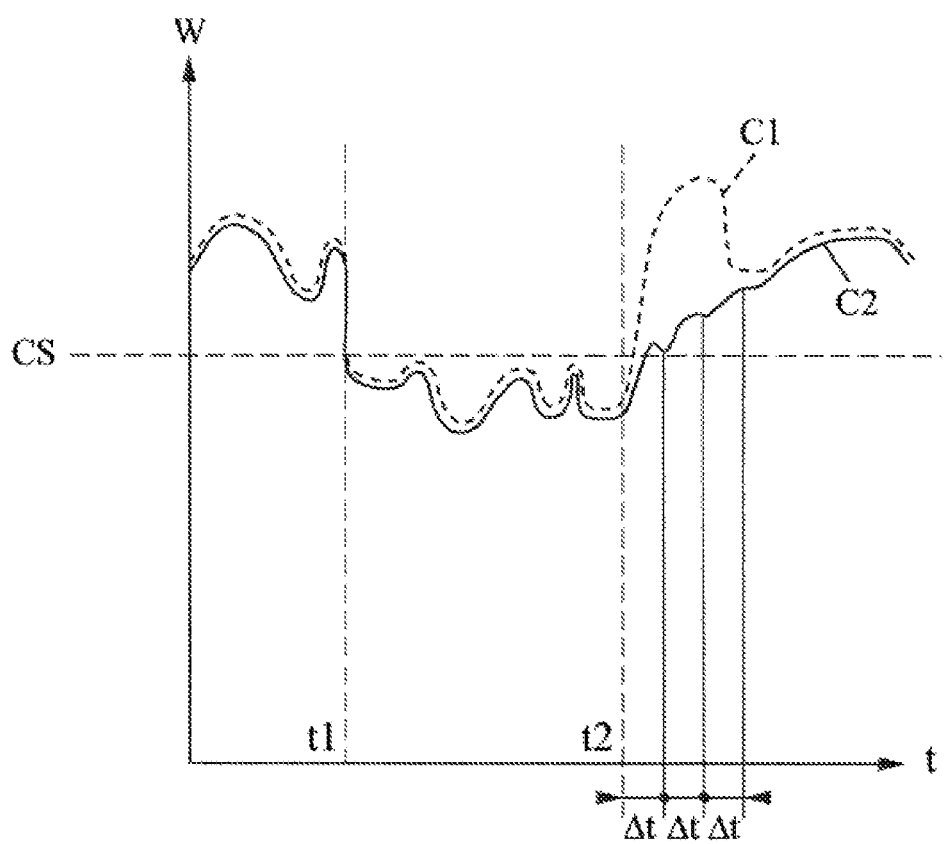
FIG. 6 is a graphical representation of a load curve of a traditional electrical installation over time, and a load curve of an electrical installation according to the invention.

We now refer to FIG. 6 in which is shown the impact of restoring load to curtailed devices of subscribers, compared with the progressive termination proposed by the method for controlling the installation (as in step 6 above).

A typical curve C1 represents the load curve of existing solutions for regulating electrical installations. Curve C varies in power along the vertical axis W, and evolves over time along the horizontal axis t. When a setting for general electrical regulation C_REG is received by the installation INS, the installation can be regulated so as to consume a load below a threshold CS for a specified period P (beginning for example at time t1 and ending at time t2). It is observed that at the end of the regulation period P ordered by the setting, a spike in consumption occurs on the curve C1. This spike in consumption is a "rebound effect" commonly caused by the abrupt restoration of curtailed feeders.

Curve C2 shows the load curve of the method for controlling the installation according to the invention. Curve C2 also varies in power along the vertical axis W, and evolves over time along the horizontal axis t. At the end of the period P of general electrical regulation, the curtailed feeders are restored to normal power (termination of curtailment) in a manner that is distributed over time. Indeed, the feeders are restored to normal load at staggered moments spaced apart by a time interval Δt. One will observe that the restoration to normal power is more gradual and the spike in consumption is not as pronounced as in curve C1.

As the rebound phenomenon is reduced or eliminated, the spike in consumption is smoothed out by distributing over time the termination of the curtailment of feeders. The load restored to the devices/subscribers is now much less likely to create a new abrupt collapse in frequency, due to the progressive restoration of load to the feeders.

The distribution over time is advantageously a function of the curtailment priority ranks associated with the levels of participation of the feeders. In this manner, the termination of the curtailment of feeders is ordered by priority rank. However, additionally or alternatively, the distribution over time may be random. This embodiment may be used with feeders having the same priority rank, so that the termination of curtailment of these feeders is randomly spaced over time.

It should be noted that the proposed control method and electrical installation thus allow:
 equalizing the participation of devices in contributing to a curtailment;
 proper operation of connected devices (scheduling curtailment of feeders according to electrical signal quality conditions, equipment operation, and environment); and
 maintaining subscriber comfort.

The invention has been described with reference to particular embodiments, which are not limiting. Of course, the invention is not limited to the embodiment described by way of example, and it extends to other variants. In particular, the number and type of sensors may vary depending on the applications, and the modes of transmission and of accessing the collected data may vary as well.

Moreover, the database, the means for receiving settings, and the data processing means may be distributed within the installation (not all within a same management electronics module as in the above examples) and provided with means of communication allowing them to exchange the data necessary for implementing the method for controlling the electrical installation.

The invention claimed is:

1. A method for controlling an electrical installation comprising electrical feeders for supplying power to devices in a regulated manner, the method comprising:
 consulting a history of curtailments applied to said feeders;
 based on the consulted history, determining for each of the feeders a level of participation in a general electrical regulation of said installation;
 associating a curtailment priority rank with each of the levels of participation determined for each of said feeders;
 after receiving a setting for general electrical regulation of said installation, ordering a curtailment of said feeders according to their priority rank; and
 terminating curtailment of said curtailed feeders, with the termination of curtailment for each feeder being distributed over time so as to distribute a load restoration to said feeders over time with a gradual readdition of the feeders, avoiding thus a rebound effect consisting of a sudden and simultaneous power draw when said curtailment is terminated.

2. The method according to claim 1, wherein the feeders are curtailed by order of their priority rank at least until a general electric regulation of the installation corresponding to said setting is achieved.

3. The method according to claim 1, wherein said distribution over time is based on the curtailment priority ranks associated with the levels of participation of said feeders.

4. The method according to claim 3, wherein said distribution over time is random.

5. The method according to claim 1, further comprising collecting data from at least one current sensor associated with at least one of said feeders, said sensor measuring power consumption of the associated feeder, said level of participation of the associated feeder being also determined on the basis of the collected data.

6. The method according to claim 1, wherein said level of participation of at least one feeder is further determined according to the frequency of an electrical signal supplied by an electrical grid to which said installation is connected.

7. The method according to claim 1, further comprising collecting data from at least one home sensor measuring an environmental condition of the installation, said level of participation of the associated feeder being further determined on the basis of the collected data.

8. The method according to claim 1, wherein at least one of said devices is a heat exchanger and communicates data on the temperature reached by the device, said level of participation of the feeder powering the device being further determined on the basis of said temperature data.

9. An electrical installation comprising electrical feeders for supplying power to devices in a regulated manner, said installation comprising at least:
 a database adapted for storing a history of curtailments applied to said feeders;
 a receiver for receiving a setting for general electrical regulation of said installation;
 a data processor adapted for:
  determining for each of the feeders, on the basis of the history, a level of participation in a general electrical regulation of said installation;

associating a curtailment priority rank with each of the levels of participation determined for each of said feeders;

curtailing said feeders according to their priority rank; and terminating curtailment of said curtailed feeders, with the termination of curtailment for each feeder being distributed over time so as to distribute a load restoration to said feeders over time with a gradual readdition of the feeders, avoiding thus a rebound effect consisting of a sudden and simultaneous power draw when said curtailment is terminated.

10. The electrical installation according to claim 9, wherein at least one of said feeders comprises at least one current sensor adapted for measuring an outgoing current and a difference in potential.

11. The electrical installation according to claim 9, wherein the data processor is configured to detect a frequency of an electrical signal supplied by an electrical grid to which said installation is connected.

12. The electrical installation according to claim 9, further comprising at least one home sensor measuring an environmental condition of the installation.

13. The electrical installation according to claim 9, wherein at least one of said devices is a heat exchanger and comprises a communication interface for communicating data concerning the temperature reached by the device.

14. The electrical installation according to claim 9, wherein said feeder is an electrical socket.

15. The electrical installation according to claim 9, wherein said feeder is an electrical panel.

16. The electrical installation according to claim 9, wherein said feeder is an electrical hub.

17. A non-transitory computer program product comprising instructions readable by a processor of an electrical installation, said processor implementing the method according to claim 1 when said instructions are executed by said processor.

* * * * *